No. 874,469. PATENTED DEC. 24, 1907.
J. B. WHEATLEY.
SELF HEATING SOLDERING IRON.
APPLICATION FILED MAR. 2, 1905.
2 SHEETS—SHEET 1.
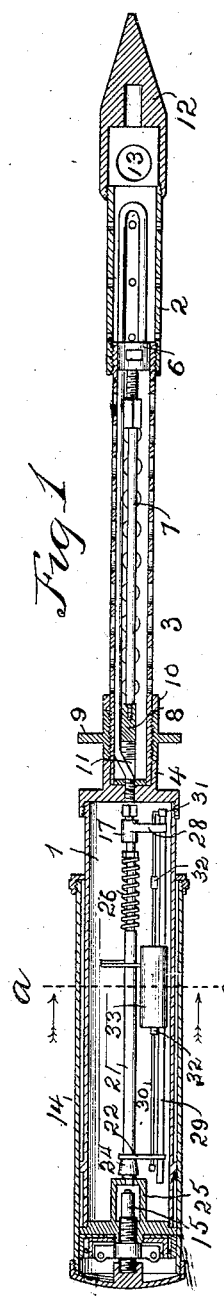
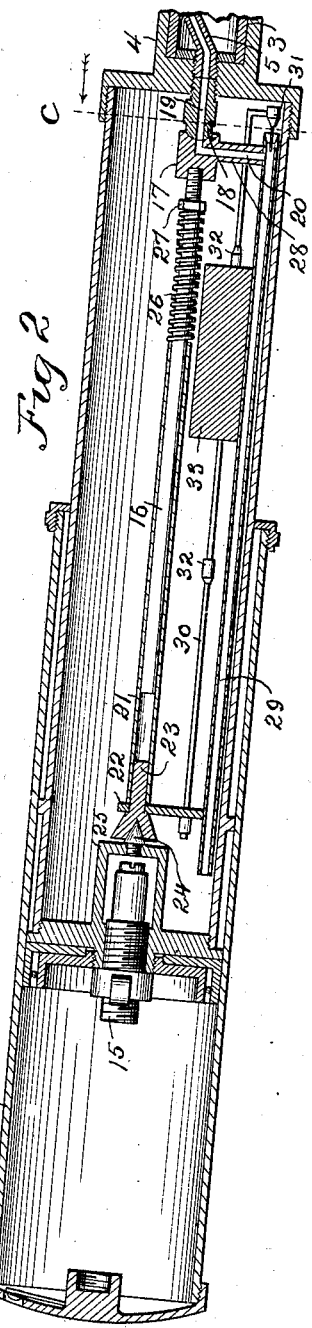
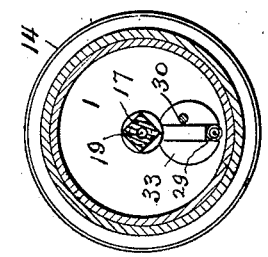
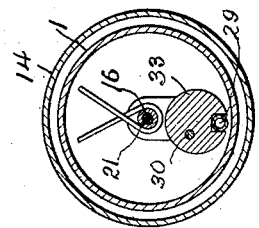
Witnesses:
R. E. Hamilton.
Max Boerngen
Inventor
James B. Wheatley
By Warren D. House
His Attorney No. 874,469. PATENTED DEC. 24, 1907.
J. B. WHEATLEY.
SELF HEATING SOLDERING IRON.
APPLICATION FILED MAR. 2, 1905.
2 SHEETS—SHEET 2.
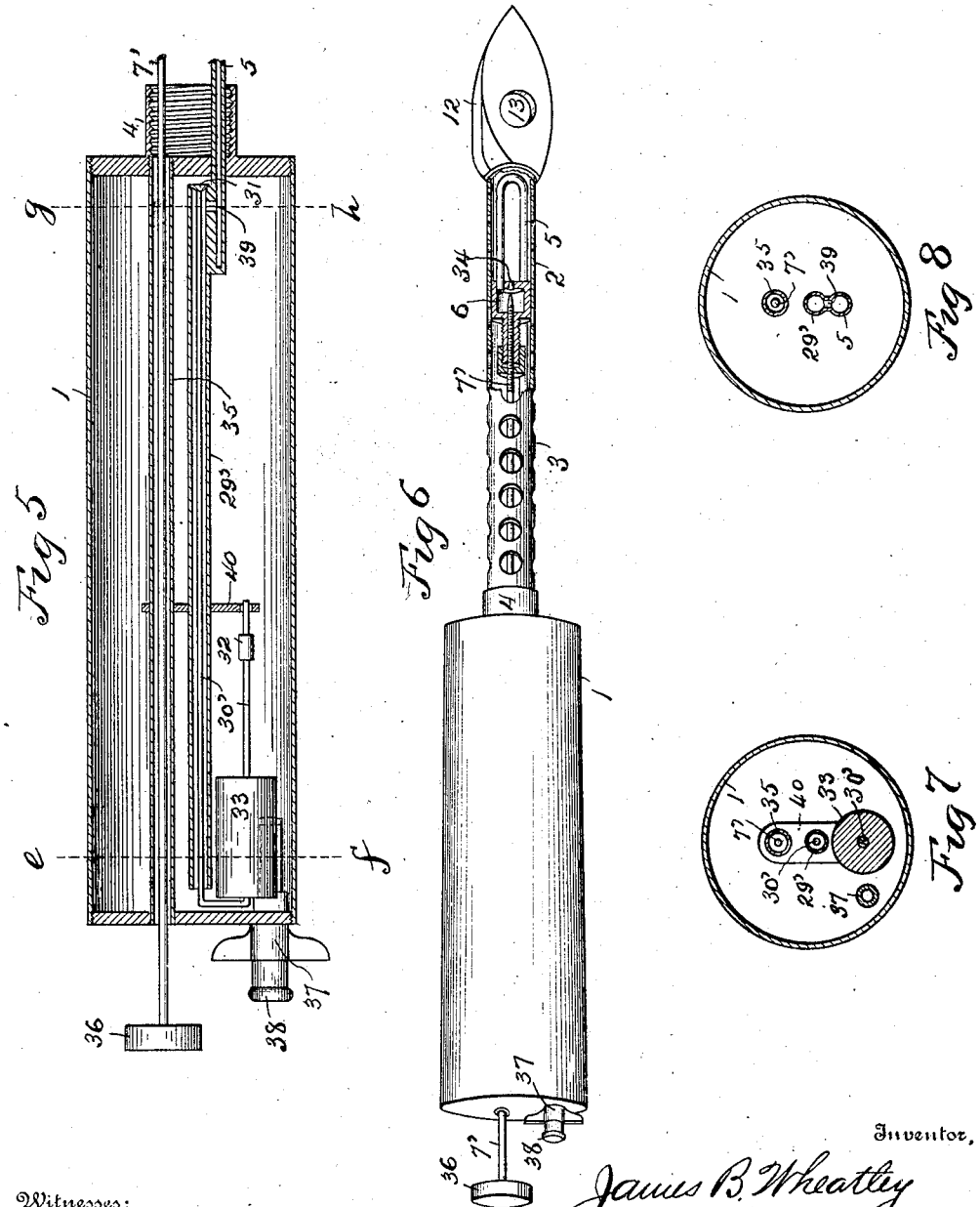
Witnesses:
R E Hamilton
Max Boerngen
Inventor,
James B. Wheatley
By Warren D. House
His Attorney

UNITED STATES PATENT OFFICE.

JAMES B. WHEATLEY, OF KANSAS CITY, MISSOURI.

SELF-HEATING SOLDERING-IRON.

No. 874,469.   Specification of Letters Patent.   Patented Dec. 24, 1907.

Application filed March 2, 1905. Serial No. 248,172.

*To all whom it may concern:*

Be it known that I, JAMES B. WHEATLEY, a citizen of the United States, residing at Kansas City, in the county of Jackson and State of Missouri, have invented certain new and useful Improvements in Self-Heating Soldering-Irons, of which the following is a specification.

My invention relates to improvements in self heating soldering irons.

It relates particularly to the class of soldering irons in which fuel liquid is held in a hollow handle, a burner being mounted on the handle, a bit or soldering iron being mounted so as to be heated by the burner and a valved conductor connecting the burner with the liquid fuel supply in the handle.

The object of my invention is to provide a soldering iron of the kind described with means for controlling the passage of the fuel liquid from the handle reservoir such that a constant flow of the liquid will be obtained irrespective of the position in which the iron may be held.

In another application filed by me on January 22, 1904, having Serial Number 190,207, I have described a soldering iron of my invention constructed with the above object in view. In that invention the reservoir or hollow handle is provided with two outlets communicating with the burner, the outlets being disposed one adjacent each end of the handle, and two connected closures, actuated by gravity when the handle is tilted, being provided for automatically and alternately opening and closing said outlets, whereby the lower outlet which is immersed in the fuel liquid will have its closure removed and the upper closure will be moved to close the upper outlet, thus excluding from the conductor leading from the handle to the burner the compressed air in the handle.

In the invention herein described and claimed, the reservoir handle is provided with two outlets similarly disposed, one of the outlets being always open, and a single closure actuated by gravity being employed for automatically opening and closing the other outlet when the handle is tilted to and fro. The employment of but a single closure simplifies the construction of the soldering iron, rendering it more certain and effective in operation, less expensive to construct, and less liable to get out of order.

My present invention provides further a construction in which the valved and open outlet will by gravity actuated means always be disposed in the lower side of the handle regardless of the rotation of the handle on its axis.

Other novel features are hereinafter fully described and claimed.

In the accompanying drawings illustrative of my invention, Figure 1 is a longitudinal central section view of one form of my invention. Fig. 2 is an enlarged longitudinal sectional view of the handle and parts connected therewith, a portion of the shank and conductor leading to the burner being shown. Fig. 3 is a cross section taken on the dotted line $a$—$b$ of Fig. 1. Fig. 4 is a cross section taken on the dotted line $c$—$d$ of Fig. 2. Fig. 5 is a longitudinal central sectional view of the handle and parts connected therewith of another form of my invention, shown also in Fig. 6, and in which the positions of the two outlets do not change relative to the handle when the latter is rotated on its axis. Fig. 6 is a view partly in elevation and partly in central longitudinal section of the form of my invention a part of which is shown in Fig. 5. Fig. 7 is a cross section taken on the dotted line $e$—$f$ of Fig. 5. Fig. 8 is a cross section taken on the dotted line $g$—$h$ of Fig. 5.

Similar characters of reference denote similar parts.

Referring to the form illustrated in the first four figures of the drawings, 1 denotes a cylindrical tubular handle forming the reservoir for holding the liquid fuel supply, such as gasolene. The burner comprises a perforated tube 2 mounted on the outer end of a tubular shank 3 the inner end of which is secured to one end of the handle 1 by means of a central tubular boss 4 provided on the adjacent end of the handle 1. A supply conductor 5 has its inner end secured in a central hole in the end of the handle 1; the outer end of the conductor being U shaped and the extreme end being secured to a generating chamber 6 located in the burner tube 2 which is provided with a central discharge opening, not shown, at its outer end. A longitudinal valve stem 7 has its outer end slidably mounted in the inner end of the chamber 6 and is adapted to close the discharge opening in the outer end of the chamber 6. The inner end of the valve stem is secured to a longitudinally slidable block 8 the side edges of which are screw threaded and engage the screw threaded interior of a hand wheel 9 rotatively mounted on the rear end of the shank 3, the rear end of the wheel bearing upon the boss 4 and the forward end upon a ring 10 secured upon the shank 3. The block 8 is slidably mounted in oppositely disposed slots 11 provided in the walls of the shank 3. Upon the outer end of the burner tube 2 is mounted a bit or soldering iron 12, the rear end of which is hollow and the walls of which are provided with holes 13. By rotating the wheel 9 the valve stem 7 may be moved lengthwise so as to open or close the exit orifice in the outer end of the chamber 6. The parts forward of the handle 1 are fully described in the application above referred to so that only a general description of said parts is deemed necessary herein.

On the rear end of the handle 1 is reciprocatively mounted a longitudinally slidable tube 14 the outer end of which is closed. In the rear end of the handle 1 is provided an air inlet tube 15 having a valve which is fully described in the aforesaid application and which permits ingress but prevents egress of the air through the tube 15. By reciprocating the tube 14 air is pumped into the handle or reservoir 1 until the proper pressure is obtained.

The swinging frame which carries the discharge conductor, the ends of which form the two outlets of the reservoir 1 comprises the following parts. A longitudinal axial rod 16 has its rear end secured to a casting 17 which has its forward end pivotally mounted on a stud 18 secured in the hole in which is secured the inner end of the conductor 5, the stud being provided with a central longitudinal hole 19 communicating with the hole in the tube 5 at its outer end and at its inner end with a passage 20 provided in the casting 17. The other end of the rod 16 is slidably mounted in one end of a tube 21 the rear end of which is secured in a transverse plate 22 mounted on a plug 23 which is rotatively mounted at its rear end on a central pivot pin 24 secured to a U shaped bridge 25 provided on the inner side of the central part of the rear end of the reservoir 1. A coil spring 26 encircles the rod 16 and bears at its forward end upon the nut 27 mounted on the screw threaded outer end of the rod, the rear end of the spring bearing upon the forward end of the tube 21.

The tension of the spring 26 retains the plug 23 and the casting 17 in engagement with the pin 24 and the stud 18 respectively. The casting 17 is provided with a lateral arm 28 disposed on the same side and parallel with the plate 22. A longitudinal conductor tube 29 has its ends secured respectively in the plate 22, and the arm 28, the outer end of the tube having a lateral hole communicating with a passage 20 in the casting. Slidably mounted in the plate 22 and the arm 28 respectively is mounted a longitudinal rod 30 the outer end of which is provided with a conical valve or closure 31 adapted to cover the inlet or open end of the tube 29. The other end of the tube 29 is always open. On the rod 30 between stop sleeves 32 secured to the rod 30 is longitudinally slidable a weight 33 adapted when the handle 1 is tilted to and fro endwise to alternately strike the stop sleeves 32 and thus move the rod 30 endwise so as to cover or uncover the outer end of the tube 29.

In operating this form of my invention, air is first pumped into the reservoir or handle 1 by reciprocating the tube 14 on the handle, fuel, such as gasolene, first having been inserted through the tube 15, in the manner described in the aforesaid application. By rotating the hand wheel 9 in the proper direction the valve stem 7 may be moved rearwardly so as to permit the oil to pass out the generating chamber 6 into the burner tube 2 where it is ignited and by heating the chamber 6 and outer end of the tube or supply conductor 5 generates the oil into vapor which mixing with air taken through the lateral holes in the shank 3 and burner tube 2 forms a combustible vapor which in burning heats the bit or soldering iron 12. When the handle 1 is tilted downward at its forward end the weight 33 strikes the forward stop sleeve 32 and forces the rod 30 forward thus removing the closure 31 from the outer inlet of the tube 29. The compressed air in the rear upper end of the handle 1 will force the oil through the outer inlet of the tube 29, thence through the passage 20, thence through the hole in the stud 18 into the conductor 5. If the handle 1 is tilted downwardly at its rear end the weight 33 will slide on the rod 30 so as to strike the rear stop sleeve 32 thus forcing the rod 30 rearwardly and forcing the closure 31 into the outer inlet end of the tube 29, thus preventing air in the upper forward end of the handle from passing into the tube 29. In the meantime the rear end of the tube 29 being open, the oil will enter the tube from that end and passing from thence into the passage 20 enters the conductor 5. It will thus be seen that one closure is sufficient to prevent compressed air entering the passage 20. In the event that the handle 1 is rotated on its axis the swinging frame carrying the conductor 29 will swing by gravity to a position in which the conductor or pipe 29 is in the lower side of the handle, one end of said tube is therefore always immersed in the oil until the supply has become sufficiently low for replenishing.

In the form shown in Figs. 5, 6, 7 and 8, the forward end of the instrument including the shank, burner, generator and tip or soldering iron are constructed similarly to the form hereinbefore described. In Fig. 6 is shown the exit opening of the generating chamber 6, said opening being denoted by 34. The valve stem 7' extends rearwardly through the shank 3 into and through a longitudinal tube 35 the ends of which are secured to and extend through the two ends respectively of the handle 1. The forward end of the stem 7' is screw threaded and fitted to a screw threaded hole provided in the rear end of the chamber 6. The rear end of the stem 7' is provided outside the handle 1 with a disk 36 by which the stem is rotated. By rotating the stem 7' properly the stem 7' may be made to close the exit opening 34. The rear end of the handle 1 is provided with a hole in which is secured an oil inlet tube 37 the outer end of which has fitted to it a cap 38. The conductor 5 extends through the outer end of the handle 1, its rear end being closed. A longitudinal tube 29' which is open at both ends has its forward end secured side by side to the rear end of the conductor 5. A lateral passage 39 connects the passages of the conductors 5 and 29' respectively. A longitudinally slidable rod 30' is mounted in and extends through the tube 29', the forward end being provided with the closure 31. The rear end of the rod is formed U shape, its forward arm being slidably mounted in a transverse hole provided in a transverse plate 40 secured to the tube 35. A weight 33 is slidably mounted on said arm of the rod 30' outside the tube 29' to the rear of the stop 32 secured on the said arm to the rear of the plate 40.

In operating this form of my invention, the air is introduced through the tube 37 by means of an ordinary air pump such as is used for inflating bicycle tires, oil first having been placed in the handle through the tube 37. The cap 38 is then affixed on the tube 37. By properly rotating the stem 7' the inlet 34 may be opened permitting the oil to pass out of the chamber 6 into the burner tube 2. The handle 1 being tilted downwardly at its forward end the weight 33 will strike the stop 32 and force the rod 30' and closure 31 forward thus opening the forward end of the tube 29' and the compressed air at the rear upper end of the handle will force the oil into the forward end of the tube 29', thence by passage 39, conductor 5 into the generating chamber 6 where the oil is generated into vapor which passes from said chamber through the outlet 34. If the handle is tilted downwardly at its rear end, the weight 33 will slide rearwardly on the rod 30' until the weight strikes the transverse part of the U shaped portion of the rod forcing the rod and closure 31 rearwardly until the closure closes the forward end of the tube 29', thus preventing air entering the tube 29'. At this time the oil will enter the tube 29' through its immersed rear end.

In using this form of my invention suffi- cient oil must always be kept in the handle to cover the tube 29' when the handle is held horizontally, otherwise air may enter the tube 29'.

My invention may be modified in other ways without departing from its spirit.

Having thus described my invention, what I claim and desire to secure by Letters Patent, is:—

1. The combination with a reservoir having two outlets, of a closure for one of said outlets, and a movable weight actuated by gravity for alternately moving said closure to open and close its outlet.

2. The combination with a reservoir having two outlets, of a closure for one of said outlets, and a slidable weight connected to said closure and movable to and fro by the tilting of the reservoir.

3. The combination with a reservoir having two outlets one of which is always open, of a closure for the other outlet, and a slidable weight connected to said closure.

4. The combination with a reservoir having two outlets of a burner communicating with said outlets, a closure for one of said outlets, and a gravity actuated weight connected with said closure.

5. The combination with a reservoir having two outlets of a burner communicating with said outlets, a closure for one of said outlets, and a slidable weight connected with said closure.

6. The combination with a reservoir having two outlets, one of which is always open, of a burner communicating with said outlets, a closure controlling the other of said outlets, and a weight movable by gravity when the reservoir is tilted for moving the closure to and from the open position.

7. The combination with a reservoir, of a tube disposed lengthwise therein and having two inlets, one at each end, a closure for one of said inlets, and a weight connected with said closure and movable by gravity when the reservoir is tilted to move the closure relative to the inlet covered by the closure.

8. The combination with a reservoir, of a tube disposed lengthwise therein and having two inlets one at each end, a burner communicating with said tube, a closure for one of said inlets, and a weight connected with said closure and movable to and fro by the tilting of the reservoir.

9. The combination with a reservoir, of a tube disposed lengthwise therein and having two inlets one at each end, a burner communicating with said tube, a closure for one of said inlets, and a weight slidably mounted in the reservoir and connecting with the closure.

10. The combination with a reservoir having two outlets disposed one adjacent each end, of a burner communicating by means of said outlets with the reservoir, means for compressing air in said reservoir, a closure for one of said outlets, and a slidable weight for moving said closure to and fro.

11. The combination with a bit, of a burner for heating the same, a reservoir, a tube disposed lengthwise in the reservoir and having two inlets disposed one adjacent each end, the tube communicating with the burner, a closure for one of said inlets, and a gravity actuated weight for moving the closure.

12. The combination with a bit, of a burner for heating the same, a reservoir, means for compressing air in the reservoir, a tube disposed lengthwise in the reservoir and having two inlets disposed one adjacent each end, the tube communicating with the burner, a closure for one of said inlets, and a gravity actuated slidable weight connected with said closure.

13. The combination with a reservoir, of a tube journaled in the reservoir and revoluble around the axis of the reservoir and having an outlet and two inlets disposed one adjacent each end, a closure for one of said inlets, and a slidable weight for automatically moving said closure when the reservoir is properly tilted.

In testimony whereof I affix my signature in presence of two witnesses.

JAMES B. WHEATLEY.

Witnesses:
WARREN D. HOUSE,
HENRY F. ROSE.